United States Patent [19]
Guhlin

[11] Patent Number: 5,280,941
[45] Date of Patent: Jan. 25, 1994

[54] ANTI-THEFT BALL ASSEMBLY FOR BALL AND SOCKET TRAILER HITCH

[76] Inventor: Kjall G. Guhlin, 11727 Sheridan, Houston, Tex. 77050

[21] Appl. No.: 65,574

[22] Filed: May 24, 1993

[51] Int. Cl.⁵ .............................. B60D 1/60
[52] U.S. Cl. .................. 280/507; 280/511; 411/910
[58] Field of Search .......... 280/507, 508, 511; 411/222, 237, 429, 910

[56] References Cited

U.S. PATENT DOCUMENTS

| | | | |
|---|---|---|---|
| 3,325,187 | 6/1967 | Noakes | 280/508 |
| 3,414,295 | 12/1968 | Rendessy | 280/511 |
| 3,756,624 | 9/1973 | Taylor | 280/423 |
| 3,963,264 | 6/1976 | Down | 280/415 |
| 4,230,336 | 10/1980 | Avrea et al. | 411/910 X |
| 4,253,509 | 3/1981 | Collet | 411/910 X |
| 4,840,392 | 6/1989 | Baskett | 280/477 |
| 4,863,185 | 9/1989 | Coppe | 280/511 X |
| 4,907,929 | 3/1990 | Johnston, Jr. | 411/910 X |
| 5,064,326 | 11/1991 | Davis et al. | 411/910 X |
| 5,087,064 | 2/1992 | Guhlin | 280/511 X |
| 5,108,123 | 4/1992 | Rubenzik | 280/477 |
| 5,131,796 | 7/1992 | Herum et al. | 280/511 X |
| 5,222,755 | 6/1993 | O'Neal | 280/511 X |

FOREIGN PATENT DOCUMENTS 2609944  7/1988  France .................. 280/511

Primary Examiner—Margaret A. Focarino
Assistant Examiner—Carla Mattix
Attorney, Agent, or Firm—Vaden, Eickenroht, Thompson, Boulware & Feather

[57] ABSTRACT

An anti-theft ball assembly for a ball and socket hitch is disclosed where the mounting bolt and retaining nut that clamp the ball assembly to a tow bar are covered by a cup-shaped cover that combines with the socket to prevent access to the mounting bolt and mounting nut.

4 Claims, 2 Drawing Sheets

ANTI-THEFT BALL ASSEMBLY FOR BALL AND SOCKET TRAILER HITCH

This invention relates generally to the ball assembly of a ball and socket trailer hitch and, in particular, to a ball assembly that prevents access to the mounting bolt and nut that clamp the assembly to the tow bar thereby deterring theft of the towed vehicle by disconnecting the ball from the tow bar.

An anti-theft ball for use with ball and socket hitches is disclosed by Avrea U.S. Pat. No. 4,230,316, which issued on Oct. 28, 1980. Avrea uses an externally threaded mounting bolt that engages an internally threaded central opening in the ball. A smaller diameter locking bolt extends downwardly through a smaller diameter opening in the top of the ball and engages an internally threaded opening in the upper end of the mounting bolt. The threads on the mounting bolt and the threads on the locking bolt have a different pitch. Access to the locking bolt is prevented by the socket of the hitch and the different pitches prevent the mounting bolt from being unscrewed from the ball.

In my previously issued U.S. Pat. No. 5,087,064, entitled "Anti-Theft and Safety Device for a Ball and Socket Trailer Hitch", which issued Feb. 11, 1992, I disclosed apparatus for preventing the socket of such a hitch from being disconnected from the ball inadvertently or without the owners' permission. But nothing was provided to protect the ball.

Therefore, it is an object of this invention to provide a ball assembly for a ball and socket hitch that protects the ball from being disconnected from the tow bar when the socket is in engagement with the ball. This combined with the theft prevention apparatus of the '064 patent described above, provides complete anti-theft protection for the towed vehicle.

It is a further object of this invention to provide a ball assembly of a ball and socket hitch that has a cover for the nut on the threaded shaft of the hitch that clamps the ball and socket to the tow bar to prevent access to the nut when the socket of the hitch is in engagement with the ball.

It is a further object of this invention to provide such a ball assembly where the cover for the mounting nut is held in position by a cover mounting bolt located in a longitudinal opening in the ball that engages threads in the cover and is held against rotation relative to the cover by a thread locking compound, thereby preventing the cover from being removed as long as the socket of the hitch is positioned on the ball.

These and other objects, advantages, and features of this invention will be apparent to those skilled in the art from a consideration of this specification, including the attached drawings and appended claims.

IN THE DRAWINGS

FIG. 1 is a side view in elevation of one embodiment of the ball assembly of this invention mounted on a tow bar with the socket of the ball and socket hitch in position over the ball and the anti-theft device described in U.S. Pat. No. 5,087,064 in position to prevent inadvertent or intentional removal of the socket from the ball.

Figure 1:
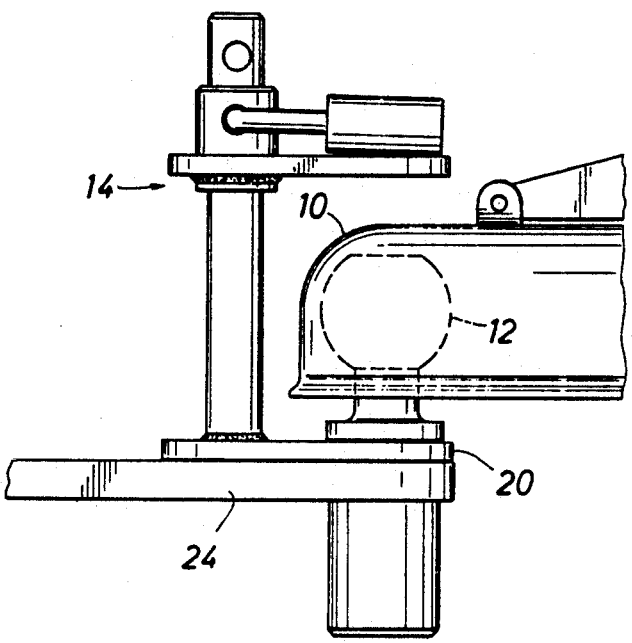

As stated above, FIG. 1 shows socket 10 of a ball and socket hitch in engagement with ball 12 shown in dotted lines and anti-theft apparatus 14, which, as explained above, is designed to prevent the removal of socket 10 from ball 12 either inadvertently or without the owner's permission. This anti-theft apparatus is fully described in U.S. Pat. No. 5,087,064 and that patent is incorporated herein by reference.

Figure 2:
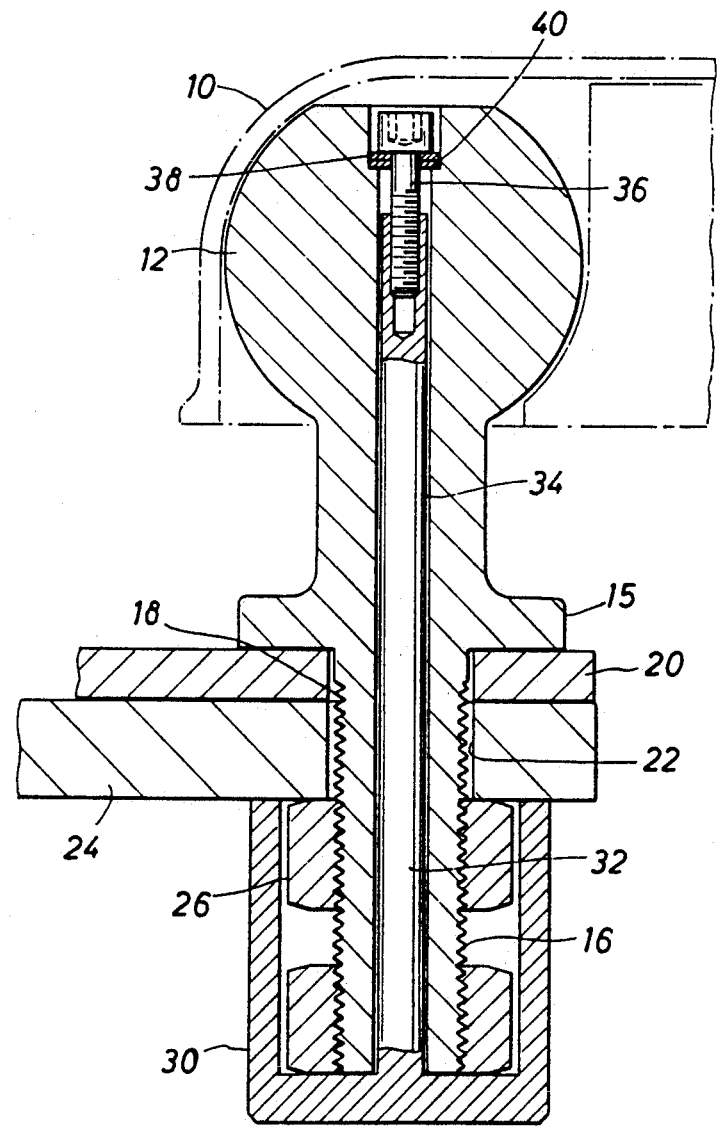
FIG. 2 is a vertical sectional view through the ball assembly of FIG. 1 with the socket shown in phantom lines.

As shown in FIG. 2, the ball assembly includes base 15 and threaded shaft 16. The threaded shaft extends through opening 18 in mounting plate 20 of the anti-theft device and opening 22 in tow bar 24. Mounting nut 26 clamps plates 20 and 24 between the nut and base 15 to secure the ball assembly to the tow bar. In the embodiment shown, an additional nut 28 is located at the lower end of the threaded shaft. This provides greater lateral stability to cup-like cover 30 when it is positioned to cover the lower end of threaded member 16 and nuts 26 and 28, with the open upper end of the cup-like cover in engagement with tow bar 24.

Means are provided for holding cup-like cover 30 in position, as shown in FIG. 2, to prevent access to mounting nut 26 and thereby prevent unauthorized removal of the ball from the tow bar. In the embodiment shown in FIG. 2, such means includes cover mounting bar 32, which has its lower end attached to the bottom of cover 30 and which extends upwardly into central opening 3 that extends along the longitudinal axis of the threaded shaft and the ball. The upper end of mounting bar 32 is drilled and tapped to be connected to retaining bolt 36. The head of the retaining bolt engages washers 38 that engage upwardly facing shoulder 40 provided by countersinking the upper end of opening 34. The retaining bolt holds the mounting rod against longitudinal movement downwardly with respect to opening 34. This, in turn, holds cover 30 in the position shown in FIG. 2 with its upper end in engagement with the tow bar and completely covering mounting nut 26.

Before mounting bolt 36 is screwed into the upper end of mounting bar 32, the threads are coated with a thread locking compound that will hold the mounting bolt and mounting bar against relative rotation. As a result, rotating cover 30 will not cause mounting bar 32 to unscrew from retaining bolt 36. One such thread locking compound is sold under the trademark VIBRA-TITE®, which is described in U.S. Pat. No. 3,893,496 and is a product of ND Industries, Inc., 1893 Barrett Road, Troy, Mich. 48084.

Figure 3:
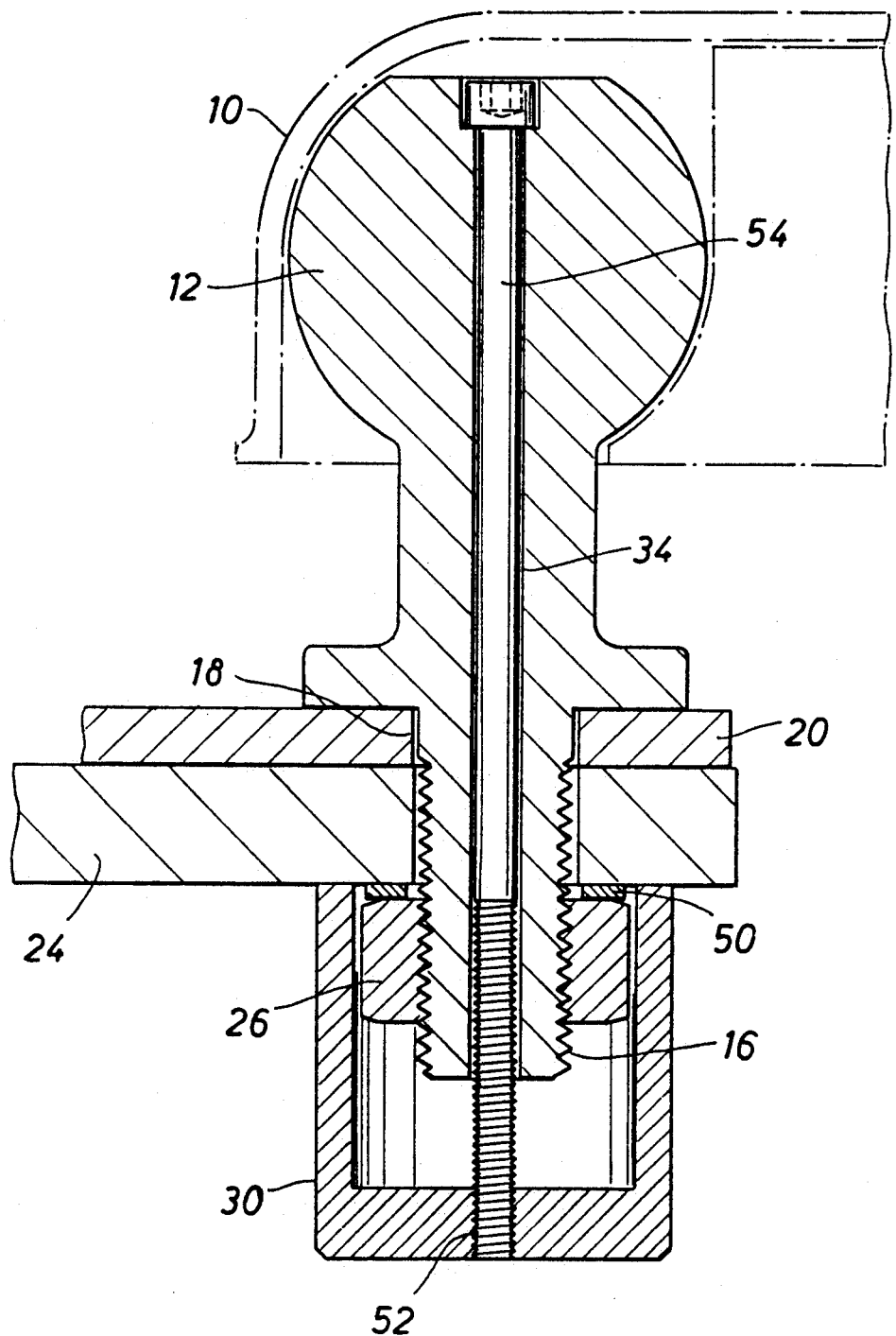
FIG. 3 is an alternate embodiment of the invention.

An alternate and preferred embodiment of the invention is shown in FIG. 3. Most of the elements of this embodiment are the same as that shown in FIGS. 1 and 2 and therefore will retain the same numbers. The difference is that threaded shaft 16 is shorter and only mounting nut 26 is used. In addition, lock washer 50 is located between mounting nut 26 and tow bar 24.

The structure of the cover and the means for holding the cover in position enclosing mounting nut 26 has been changed. Instead of mounting bar 32, the cover is provided with tapped opening 52 in the base of the cup-shaped cover. Mounting bolt 54 extends all the way through longitudinal opening 34 to engage threads 52 in the base of the cover as shown in the drawing. When the hitch ball assembly is sold, mounting bolt 54 is purposely designed to be much longer than that required for any perceived thickness of tow bar and mounting plate. This allows the purchaser to mount the ball on his tow bar with the cover held in position against the tow bar and then the cut-off portion of the mounting bolt extending below the cover. The engaging threads on tapped opening 52 and mounting bolt 54 are again coated with a thread locking compound so that rotation of cover 30 will simply cause mounting bolt 54 to rotate with the cover. Thus, cover 30 cannot be removed to allow access to mounting nut 26 until socket 10 is removed from the ball. Then a wrench, in this case an Allen wrench, can engage the head of the mounting bolt and hold the mounting bolt while the cover is rotated or vice versa with sufficient torque to overcome the holding power of the thread locking compound and disconnect the cover from the mounting bolt.

From the foregoing it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense.

What is claimed is:

1. An anti-theft ball assembly for mounting on the tow bar of a towing vehicle comprising a ball, a threaded shaft attached to the ball for engaging an opening in the tow bar, and a mounting nut for engaging the threaded shaft to clamp the ball to the tow bar, an opening extending along the longitudinal axis of the threaded shaft and the ball, said opening being of different diameters to provide an upwardly facing shoulder, a cup-shaped cover for extending over the threaded shaft and the mounting nut with its open end engaging the tow bar, said cover having a threaded opening in alignment with the longitudinal opening, a threaded cover mounting bolt having an enlarged head and a threaded shaft positioned in the longitudinal opening with the enlarged head in engagement with the upwardly facing shoulder and the threaded shaft in engagement with the threaded opening in the cover to hold the cover in position covering the mounting nut, and thread locking compound on the engaging threads to prevent relative rotation between the cover and the bolt so that rotation of the cover will also rotate the mounting bolt to prevent the cover from being disconnected from the mounting bolt to expose the mounting nut.

2. The ball assembly of claim 1 in which the cup-shaped cover has cylindrical side walls and a flat sided base and the threaded opening is located in the base of the cup-shaped cover.

3. The ball assembly of claim 1 in which the cup-shaped cover includes an elongated shaft attached at one end to the cover for extending into the longitudinal opening in the threaded shaft and ball with the threaded opening for engaging the mounting bolt being located in the end of the shaft located in the longitudinal opening.

4. An anti-theft ball assembly for mounting on the tow bar of a towing vehicle comprising a ball, a threaded shaft attached to the ball for extending through an opening in a tow bar, and a mounting nut for engaging the threaded shaft to clamp the ball to the tow bar, a central opening extending along the longitudinal axis of the ball and threaded shaft, a cup-shaped cover for positioning over the threaded shaft and mounting nut and in engagement with the tow bar to prevent access to the mounting nut, a threaded opening in the bottom of the cover, a threaded cover mounting bolt located in the central opening with its head in engagement with the ball and its threads in engagement with the threaded opening in the cover to hold the cover in engagement with the tow bar, and means for preventing relative rotation between the cover and the mounting bolt when the cover is rotated.

* * * * *